US006594554B1

(12) United States Patent
Seem et al.

(10) Patent No.: US 6,594,554 B1
(45) Date of Patent: Jul. 15, 2003

(54) APPARATUS AND METHOD FOR INTELLIGENT CONTROL OF THE FAN SPEED OF AIR-COOLED CONDENSERS

(75) Inventors: John E Seem, Glendale, WI (US); Jonathan D West, Brown Deer, WI (US); Willem Huisman, Veenwouden (NL)

(73) Assignee: Johnson Controls Technology Company, Plymouth, MI (US)

( * ) Notice: Subject to any disclaimer, the term of this patent is extended or adjusted under 35 U.S.C. 154(b) by 392 days.

(21) Appl. No.: 09/613,844

(22) Filed: Jul. 11, 2000

Related U.S. Application Data

(60) Provisional application No. 60/146,026, filed on Jul. 28, 1999.

(51) Int. Cl.⁷ ................................................ G01M 1/38
(52) U.S. Cl. ........................................ 700/276; 62/181
(58) Field of Search .............................. 700/276, 275, 700/278, 282; 62/181, 183

(56) References Cited

U.S. PATENT DOCUMENTS

| | | | | |
|---|---|---|---|---|
| 3,354,665 | A | | 11/1967 | Lewis ........................... 62/184 |
| 3,390,539 | A | | 7/1968 | Miner ........................... 62/184 |
| 4,120,173 | A | | 10/1978 | Kimpel .......................... 62/181 |
| 5,040,377 | A | | 8/1991 | Braun et al. .................... 62/183 |
| 5,138,844 | A | * | 8/1992 | Clanin et al. .................... 62/89 |
| 5,150,581 | A | * | 9/1992 | Smith ........................... 62/115 |
| 5,333,469 | A | * | 8/1994 | Hullar et al. ................... 62/181 |
| 5,355,305 | A | | 10/1994 | Seem et al. .................... 700/141 |
| 5,385,030 | A | * | 1/1995 | Kitagawa et al. ............... 62/160 |
| 5,506,768 | A | | 4/1996 | Seem et al. ..................... 700/41 |
| 5,551,248 | A | | 9/1996 | Derosier ........................ 62/155 |
| 5,605,053 | A | | 2/1997 | Otori ............................ 62/180 |
| 5,692,387 | A | * | 12/1997 | Alsenz et al. .................. 62/184 |
| 6,055,819 | A | * | 5/2000 | Kang ............................ 62/184 |
| 6,257,007 | B1 | * | 7/2001 | Hartman ........................ 62/183 |

FOREIGN PATENT DOCUMENTS

| | | |
|---|---|---|
| EP | 0 509 952 A2 | 10/1992 |
| EP | 0 520 628 A2 | 12/1992 |
| EP | 0 924 480 A3 | 6/1999 |
| EP | 0 924 480 A2 | 6/1999 |
| JP | 02-279941 | 11/1990 |
| JP | 06-323608 | 11/1994 |

\* cited by examiner

Primary Examiner—Leo Picard
Assistant Examiner—Zoila Cabrera
(74) Attorney, Agent, or Firm—Foley & Lardner

(57) ABSTRACT

A refrigeration system (10) has a compressor (12) that forces a refrigerant to flow in a loop between an evaporator (17) and a condenser (16). The present method controls the speed of a condenser fan (16) in response to the condenser temperature. In a first control state, the speed of the fan (16) is varied in response to the condenser temperature. In a second state, the fan (16) is turned on and off by a pulse width modulated signal that has a duty cycle which varies in response to the condenser temperature. A transition occurs from the first state to the second state when the fan (16) operates at the slowest possible speed for a predetermined period while the condenser temperature is below a desired value. A transition occurs from the second state to the first state when the duty cycle is at 100% for a given period and the condenser temperature is above the desired value.

19 Claims, 4 Drawing Sheets

APPARATUS AND METHOD FOR INTELLIGENT CONTROL OF THE FAN SPEED OF AIR-COOLED CONDENSERS

This application claims benefit of U.S. Provisional Patent Application No. 60/146,026 filed Jul. 28, 1999.

BACKGROUND OF THE INVENTION

The present invention relates to apparatus for controlling refrigeration equipment, such as utilized in building air-conditioning systems; and particularly to controlling the speed of a fan which moves air across a condenser coil in those systems.

In the warmer months of the year, the environment inside a building is maintained at a desired temperature by an air conditioning system. Furthermore, buildings with windows that can not be opened may operate the air conditioning system even when it is relatively cold outside in order to dissipate heat from sources inside the building.

FIG. 1 illustrates the components of a refrigeration system 10 in which a refrigerant is circulated between a pair of heat exchangers located inside and outside the building in order to transfer heat from the building. The refrigerant exits a compressor 12 in the vapor phase at high temperature and pressure and flows through tubing of an air-cooled condenser 14. Air is forced over the condenser tubing by a fan 16 to transfer heat from the refrigerant to the exterior environment. As heat is removed, the refrigerant condenses into a liquid phase at moderate temperature and high pressure.

The liquid phase refrigerant then passes through an expansion device 15 which effects a pressure drop transforming the refrigerant into a mixed liquid and vapor phase at a much lower temperature and pressure. This liquid/vapor mixture flows into an evaporator 17 inside the building where the refrigerant is evaporated by interior air forced over the evaporator by another fan 18. Heat is removed from that flowing air thus cooling the interior of the building. The refrigerant leaves the evaporator 17 in a vapor phase at relatively low pressure and returns to the input of the compressor 12 where the refrigeration cycle repeats.

If the condenser air flow is too low an insufficient amount of heat will be removed from the refrigerant flowing through the condenser 14. If that happens, the pressure can rise too high and damage the system. When the outside air is too cold, the pressure at the condenser may drop considerably reducing the supply of liquid refrigerant to the evaporator 17 producing frost on the outer surface of the evaporator tubing.

To prevent these harmful conditions from occurring, various methods of pressure based control for air-cooled condensers have been developed. For that purpose, pressure sensors are provided at the condenser and the measured pressure is compared by a controller to a maximum acceptable absolute value. If the measured pressure exceeds the maximum value, the controller shuts off the compressor.

New refrigerants have been developed in response to environmental concerns regarding chlorofluorocarbon compounds. However, the more "environmentally friendly" new refrigerants require that the refrigeration system operate at higher pressures than systems using chlorofluorocarbon refrigerants. As a consequence, newer refrigeration systems are more prone to leak at joints in the tubing which carry the refrigerant. Thus it is desirable to eliminate as many joints as possible.

Because pressure sensors require physical coupling to the tubing of the refrigeration system, system control based on temperature rather than pressure has been considered. Such systems would mount temperature sensors to the exterior surface of the condenser tubing. However, temperature based control responds relatively slowly to system changes. The tubing first has to change temperature in response to the refrigerant and then the sensor has to respond to that temperature change. Therefore, the system may operate in a potentially damaging mode for some time before the temperature sensor provides an indication of that situation.

SUMMARY OF THE INVENTION

The condenser fan in a refrigeration system has its speed controlled so that the air flow produced by the fan is commensurate with the ambient temperature at the condenser. That control involves sensing a temperature of the condenser to produce a temperature measurement.

The control method has a first state in which speed of the fan is varied in response to a comparison of the temperature measurement to a temperature set point. For example, when the temperature measurement is greater than the temperature set point, the fan speed is increased to move more air across the condenser to lower the refrigerant temperature. Similarly, the fan speed is decreased when the temperature measurement is less than the temperature set point and the temperature of the refrigerant needs to be raised.

The fan speed control has a second state which is utilized when the fan has been operated at a given relatively slow speed (e.g. the slowest possible constant speed) and the temperature measurement is less than the temperature set point. In this case, the air flow needs to be reduced to allow the condenser temperature to increase, but the fan may not be able to run any slower. In the second state, the fan is pulsed on and off to send bursts of air across the coil thus reducing the total air flow. The fan is controlled by a pulse width modulated signal having a duty cycle that is varied in response to the temperature measurement.

A transition occurs from the first state to the second state when a first predefined condition occurs. For example this condition may be when the fan has operated at the slowest possible speed for a predetermined period of time while the temperature measurement is below the temperature set point. A transition occurs from the second state to the first state upon the occurrence of a second predefined condition, such as when the duty cycle of the fan is at 100% and the temperature measurement is above the temperature set point, for example.

Another aspect of the present invention is a unique start-up state in which the control is configured during a period in which the refrigeration system is warming-up. That warm-up occurs differently depending upon the ambient temperature of the environment in which the condenser is located.

DETAILED DESCRIPTION OF THE INVENTION

Figure 1:
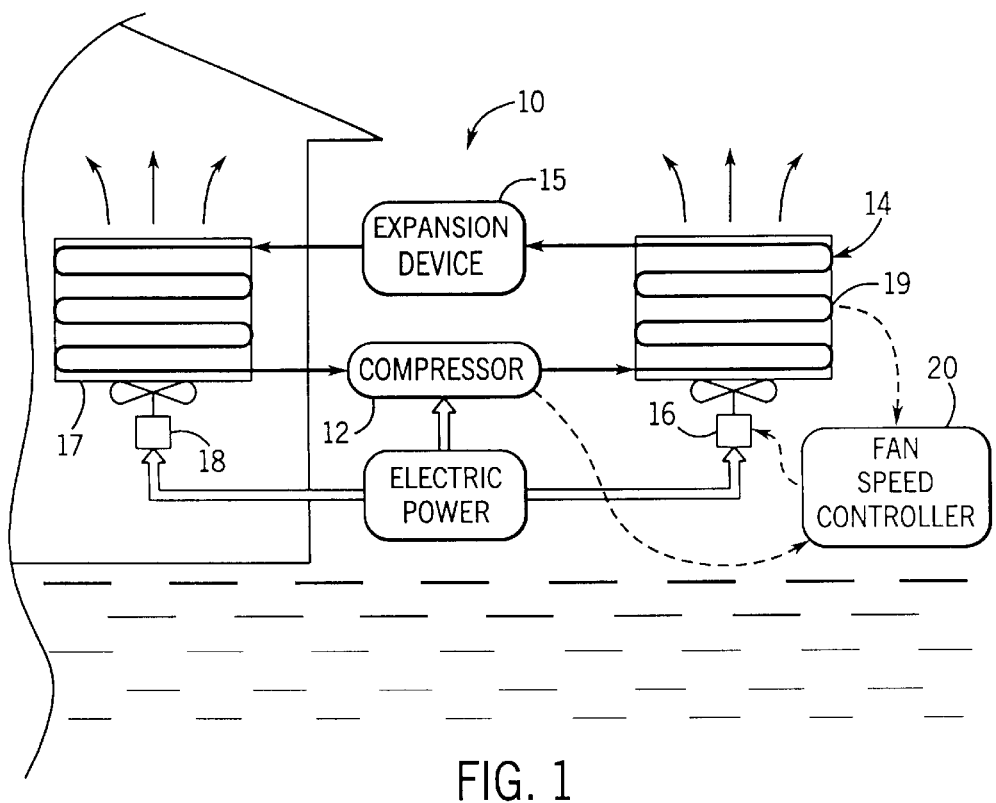
FIG. 1 is a schematic diagram of a refrigeration system according to the present invention.

With reference to FIG. 1, the refrigeration system 10, described previously, has been improved with the addition of a temperature sensor 19 attached to the exterior of the tubing for condenser 14. The temperature sensor 19 produces an electrical signal corresponding to the temperature of that tubing. The signal from the temperature sensor 19 is applied to a fan speed controller 20 which receives another input signal indicating when the compressor 12 has been turned on. The controller 20 governs the application of electricity to the motor of fan 16 which determines the speed at which the fan turns and thus the amount of air flowing through the condenser 14.

Figure 2:
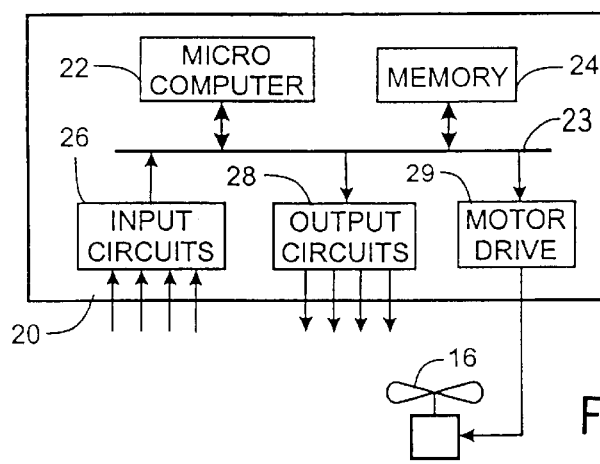
FIG. 2 is a block diagram of a fan speed controller that governs the speed of a condenser fan in FIG. 1.

The details of the fan speed controller 20 are shown in FIG. 2. Although a separate controller for fan speed is being illustrated, it should be understood that the fan speed control may be performed by a central controller which also operates the compressor. The controller 20 is based around a microcomputer 22 which is connected by a set of busses 23 to a memory 24 in which the programs and data for execution by the microcomputer are stored. The busses 23 also connect input circuits 26 and output circuits 28 to the microcomputer 22. The input circuits 26 receive the signals from the temperature sensor 19 and the compressor 12. The output circuits 28 provide signals to devices that indicate the status of the fan operation. A motor drive circuit 29 which controls the application of electricity to the motor of the fan 16 in response to signals from the microcomputer 22, as will be described.

Figure 3:
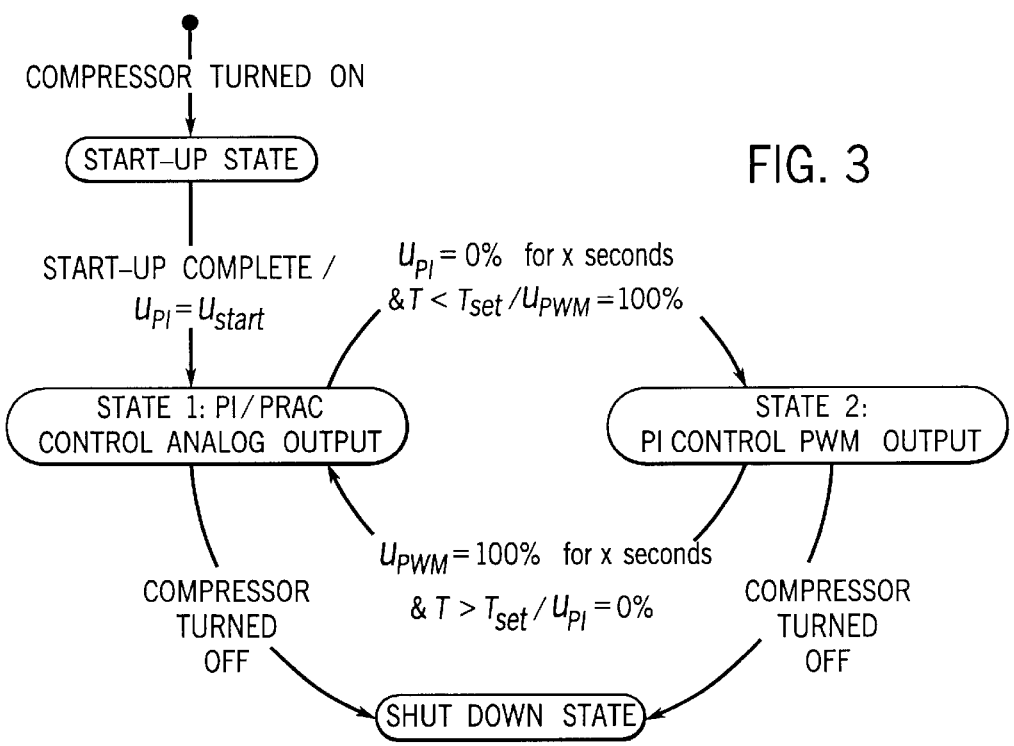
FIG. 3 is a state diagram of the four states of condenser fan control that are implemented by the controller.

For a refrigeration system to function properly, the condensing pressure and temperature must be maintained within certain limits. The fan speed controller 20 executes software which implements a state machine control algorithm for operating the condenser fan 16 to maintain the temperature within those limits. FIG. 3 shows the state diagram for the intelligent control of fan speed for air-cooled condensers. There are four states, in which a Start-up State is an intelligent procedure used to start the fan while allowing a small deviation from the condenser temperature set point. In State 1, a pattern recognition adaptive controller (PAC) tunes a proportional integral (PI) controller that maintains the condenser temperature at the set point by varying the fan speed. Specifically, the fan speed is varied by controlling the electricity applied to the fan motor. In State 2, a PI controller with a pulse width modulated output periodically turns the fan on and off to vary the condenser air flow. The controller gain and integral time in State 2 are determined from the values for those parameters in State 1. The final Shut-Down State provides a termination procedure for the state machine operation and sets the fan speed to zero while storing variables for the next time that the controller is started.

Figure 4:
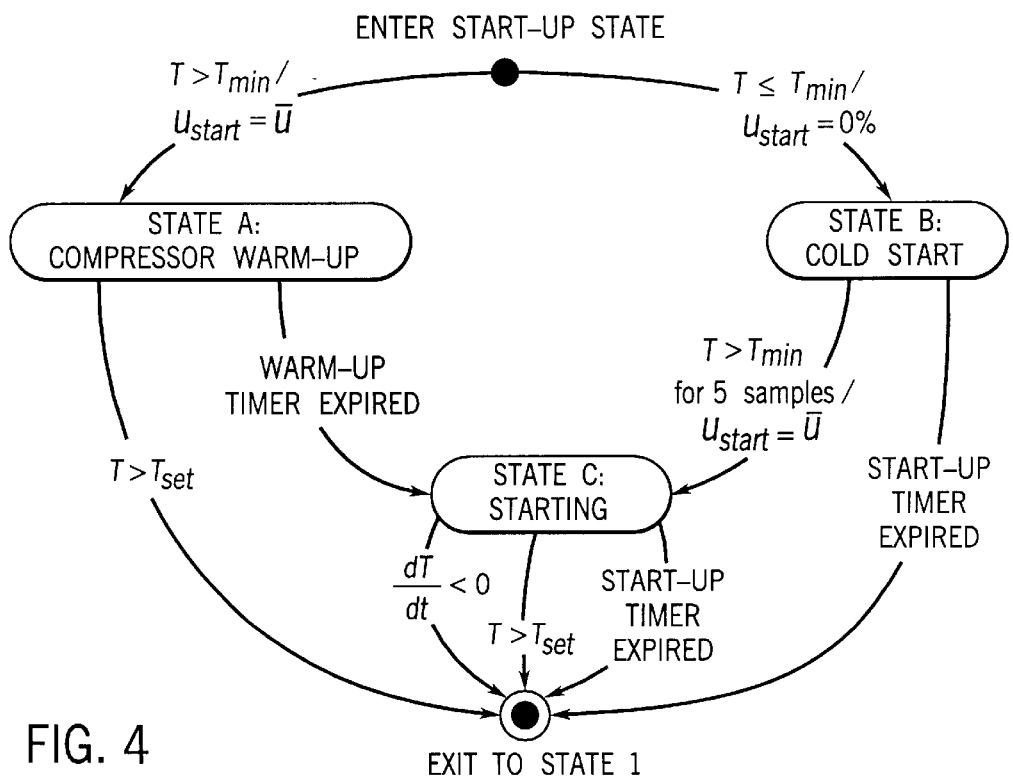
FIG. 4 is a diagram of sub-states within a start-up control state.

When the compressor 12 starts, a signal is sent to the input circuits 26 of the fan speed controller 20 in FIG. 2. In response, the microcomputer 22 begins executing the state machine control program and enters the Start-up State to initialize fan operation. At that time, a warm-up timer and a start-up timer, implemented in software, are activated. The Start-up State has three Sub-States A, B, and C as shown in FIG. 4. The output from the temperature sensor 19 is reliable when the condenser temperature is within the calibrated range of the sensor. If the measured condenser temperature (T) is greater than the minimum reliable temperature measurement ($T_{min}$), the control enters Sub-State A at which compressor warm-up occurs. Otherwise the control enters Cold Start Sub-State B.

Upon entering Sub-State A, a control output variable $u_{start}$ is set equal to an average output value ($\bar{u}$) that was determined during previous operation of the system in State 1 and stored in memory, as will be described. The average output value is expressed as a percentage of the maximum fan speed. A default output value is utilized the first time that the controller is started. The control output variable $u_{start}$ determines the voltage which the motor drive 29 applies to the condenser fan 16 according to the following expression:

$$V_{motor} = V_{min} + \left(\frac{u_{start}}{100\%}\right)(V_{max} - V_{min}) \qquad (1)$$

where $V_{min}$ is the minimum voltage for acceptable operation of the motor, $V_{max}$ is the maximum voltage for motor operation, and $u_{start}$ is the controller output in the intelligent Start-up State.

If the condenser temperature from the sensor 19 exceeds the predefined temperature set point (i.e. $T>T_{set}$), then the control advances from Sub-State A to State 1. This transition typically occurs when it is relatively hot outside the building. Otherwise, the control remains in Sub-State A until the warm-up timer expires. For example, the warm-up timer may have been set initially to thirty seconds and when that period expires the control advances to Sub-State C.

With continuing reference to FIG. 4, when Start-up State is entered, the control may transfer to Sub-State B if the sensed temperature is less than or equal to the minimum temperature $T_{min}$ of the calibration range of the temperature sensor 19. At that time, the controller output $u_{start}$ in Start-up State is set to zero percent which when applied to Equation (1) produces an output from the motor driver 29 which is the minimum voltage $V_{min}$ for safe motor operation. Thus, the fan 16 turns at the slowest possible constant speed. This state of operation may occur when the refrigeration system 10 has been turned off for a long period of time and has reached a relatively cold ambient temperature which is below the temperature range for the sensor 19.

A transition from Sub-State B to Sub-State C occurs after the microcomputer 22 reads five consecutive samples of the condenser temperature all of which are greater than the minimum reliable temperature $T_{min}$ from the sensor 19. Upon this transition, the controller output ($u_{start}$) in Start-up State is set equal to the average controller output ($\bar{u}$) that was determined previously in State 1 and stored in memory. However, when it is very cold outside the building, the condenser temperature remains below the minimum reliable sensor temperature $T_{min}$ without a transition occurring to Sub-State C. Eventually the start-up timer will expire resulting in a transition and control from Sub-State B to State 1.

In Sub-State C, the controller output is set equal to the average controller output that was determined previously at State 1. The voltage output to the motor of fan 16 is determined from Equation (1). A transition from Sub-State B to State 1 occurs if any of the following three conditions is satisfied: (1) the temperature of condenser 14 is greater than the temperature set point $T_{set}$, (2) the start-up timer expires, or (3) the slope of the condenser temperature measurements is less than zero (dT/dt=0), i.e., the temperature is decreasing. The condenser temperature will become greater than the temperature set point when it is relatively hot outside the building. The second condition occurs with normal outside temperatures, and the third condition exist when it is relatively cool outside.

Figure 5:
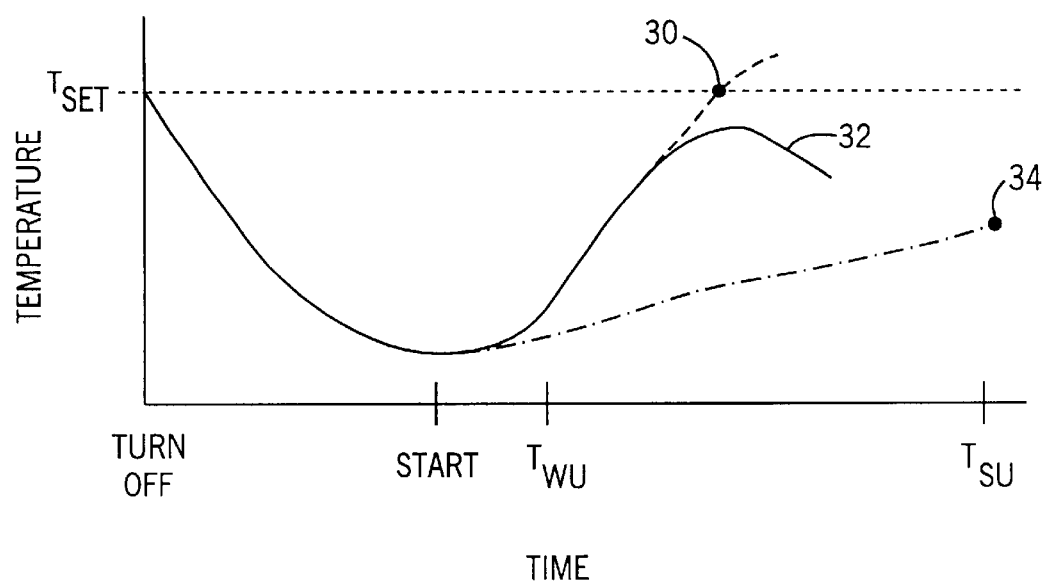
FIG. 5 graphically depicts condenser temperature changes during start-up of the fan speed controller.

With reference to FIG. 5, when the refrigeration system 10 shuts off, the temperature of the refrigerant decreases to the ambient temperature. When the system restarts, the refrigerant temperature begins to rise at a rate which is a function of the ambient temperature. That is, the warmer the ambient temperature the faster the refrigerant temperature increases. Thus, in Sub-State C determinations are made whether the refrigerant temperature has increased above the temperature set point $T_{set}$ as occurs at point 30 on the graph.

When the ambient temperature is lower, the refrigerant rises toward the temperature set point $T_{set}$ and then begins to decrease as indicated by a negative curve slope in region 32 on the graph. The slope of the condenser temperature dT/dt is estimated using seven samples of condenser temperature according to the expression:

$$\frac{dT}{dt} = \frac{1}{28h}(-3T_{t-6} - 2T_{t-5} - T_{t-4} + T_{t-2} + 2T_{t-1} + 3T_t) \quad (2)$$

where $T_{t-n}$ is the condenser temperature at n time intervals prior to the most recent sample $T_t$, and h is the time period between samples. The microcomputer 22 samples the signal from the temperature sensor 19 at fixed intervals thus producing regular sampling of the condenser temperature. Equation (2) is based on fitting a quadratic function through seven sample points as presented by Francis Scheid in *Shaum's Outline Series—Theory and Problems of Numerical Analysis— Second Edition*, 1988, McGraw-Hill Book Company, New York. Prior to acquiring the seven samples needed in Equation (2), the slope estimate is set to one.

In the third system start-up condition, the temperature of the refrigerant rises very gradually, always having a positive slope as depicted by region 34 on the graph of FIG. 5. Because the condenser temperature rise is so gradual, the start-up timer will elapse at time $T_{su}$ without the temperature exceeding the temperature set point $T_{set}$ and without curving downward. The elapse of the start-up timer at time $T_{su}$ produces a transition from Sub-State C to State 1.

In State 1, the fan speed controller 20 is configured as a proportional-integral (PI) controller that is tuned with a pattern recognition adaptive controller (PAC). This type of controller is described in U.S. Pat. No. 5,355,305.

Figure 6:
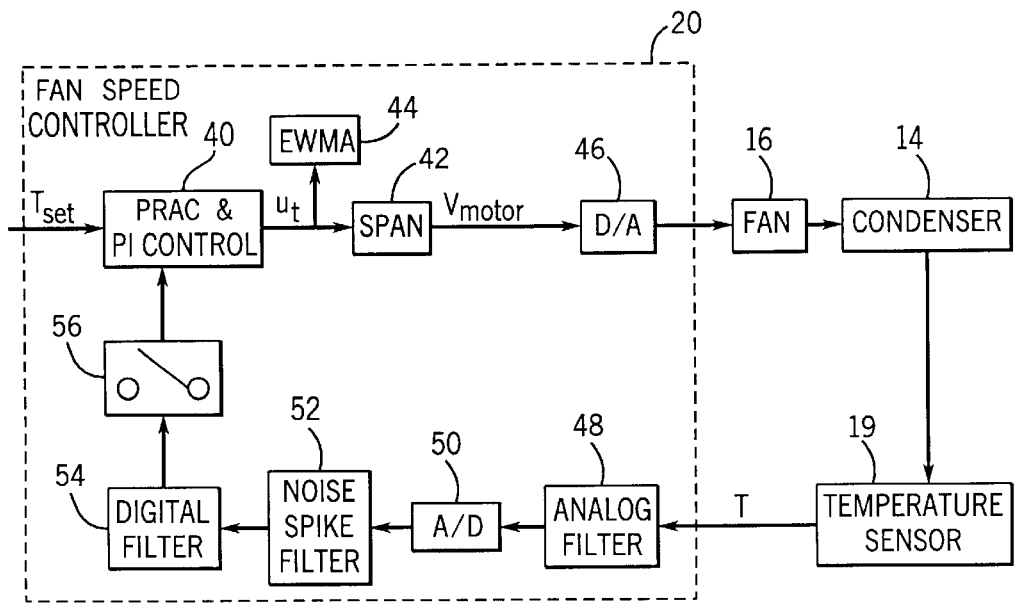
FIG. 6 is a control diagram of the controller's operation in the first control state.

With reference to FIG. 6, the fan speed controller 20 in State 1 receives the temperature set point and applies the input data to a control process 40 which implements the PAC and PI control. The output from this control process 40 is a numerical value $u_t$ designating a percentage, between 0% and 100%, of the output parameter, in this case fan speed.

The pattern recognition adaptive controller, implemented in software executed by the microcomputer 22, dynamically adjusts the proportional gain and integral time parameters of the PI control algorithm to minimize integrated absolute errors between a temperature set point and the measured condenser temperature. The PAC receives a sampled signal representative of the condenser temperature and determines a smoothed signal based on the sampled signal. The controller characterizes a disturbance in the smoothed signal by a dampening factor and closed loop response time. When a sufficient load disturbance or temperature set point change occurs, the controller estimates an optimal gain based on the dampening factor, and an optimal integral time based on the response time. The estimated optimal gain and integration time are used to determine new gain and new integral time values to which the parameters of the proportional integral control are set.

The output $u_t$ of PAC/PI control process 40 is applied to a process block 44 which derives an exponentially weighted moving average (EWMA) of the output value. The EWMA process 44 determines the long-range average of the controller output from the following equation:

$$\bar{u}_t = \bar{u}_{t-1} + \lambda(u_t - \bar{u}_{t-1}) \quad (3)$$

where $\bar{u}_t$ is the exponentially weighted moving average of the PAC/PI control process 40 at time t, $\bar{u}_{t-1}$ is the average of the control process output at sample time t−1, $u_t$ is the control process output at time t, and $\lambda$ is an exponential smoothing constant. The exponential smoothing constant is determined from the expression:

$$\lambda = (nh)/(5000 \text{ seconds}) \quad (4)$$

For example, nh may equal five seconds wherein $\lambda$ equals 0.001. For the first $1/\lambda$ samples, the EWMA is derived from:

$$\bar{u}_t = \bar{u}_{t-1} + \frac{1}{r}(u_t - \bar{u}_{t-1}) \quad (5)$$

where r is the running index of the number on samples. This average $\bar{u}_t$ is stored in a nonvolatile section of the memory 24. It is this average value that is utilized during start-up to initially control the fan 16.

The output $u_t$ of control process 40 is applied to a span process 42 which converts the output into a voltage signal $V_{motor}$ having a value between $V_{min}$ and $V_{max}$ which correspond to the voltages for the slowest and fastest constant fan speeds.

The output voltage signal $V_{motor}$ is derived according to the following equation:

$$V_{motor} = V_{min} + \left(\frac{u}{100\%}\right)(V_{max} - V_{min}) \quad (6)$$

where u is the output from the PAC and PI control process 40 and has a value between 0 and 100%.

A digital-to-analog (D/A) converter 46, within the motor drive circuit 29, produces the desired voltage level for driving the condenser fan 16. The fan forces air across the tubing of the condenser 14 resulting in condensation of the refrigerant. Temperature sensor 19 senses the condenser temperature T and produces a signal representative of that temperature which is applied to an input of the fan speed controller 20.

An analog filter performs low pass filtering on the temperature signal T to remove aliases from the signal samples. An analog-to-digital (A/D) converter 50 in input circuits 26 digitizes the temperature signal into a signal sample every h seconds, for example, once a second. A noise spike filter 52, implemented in software, removes outliers in the condenser temperature signal and a software implemented digital filter 45 removes aliases prior to sampling the digital signal in block 56 at a period equal to nh, where n is a positive integer.

Referring to FIG. 3, a smooth transfer of fan control is desired upon entering State 1 and starting the PI controller. To achieve that when the transition is from Start-up State to State 1, the initial output value from the PAC/PI process 40 is set equal to the last output value in Start-up State. If the transition occurs from State 2 to State 1, the initial output value from the PAC/PI process 40 in State 1 is zero percent.

A transition occurs from State 1 to the Shut-Down State when the compressor 12 is turned off. In Shut-Down State the operating values are stored for use upon restarting the condenser fan 16.

The control makes the transition from State 1 to State 2 after the controller output $u_t$ remains at zero percent for a predefined number (X) of seconds (e.g. X=60) and the condenser temperature T is below the set point $T_{set}$. In this case, the fan 16 is being operated at the minimum constant speed for a prolonged period of time without the refrigerant temperature increasing significantly. Thus, it is desirable to decrease the flow of air across the condenser coil 14 to reduce cooling of the refrigerant and allow its temperature to rise. However, State 1 is already maintaining the fan at the slowest constant speed possible and cannot reduce the speed further. Thus, a transition must occur to State 2 in which the fan will be periodically pulsed on and off using pulse width modulation in order to reduce the amount of air flowing-through the condenser 14 and produce an increase in the refrigerant temperature.

Figure 7:
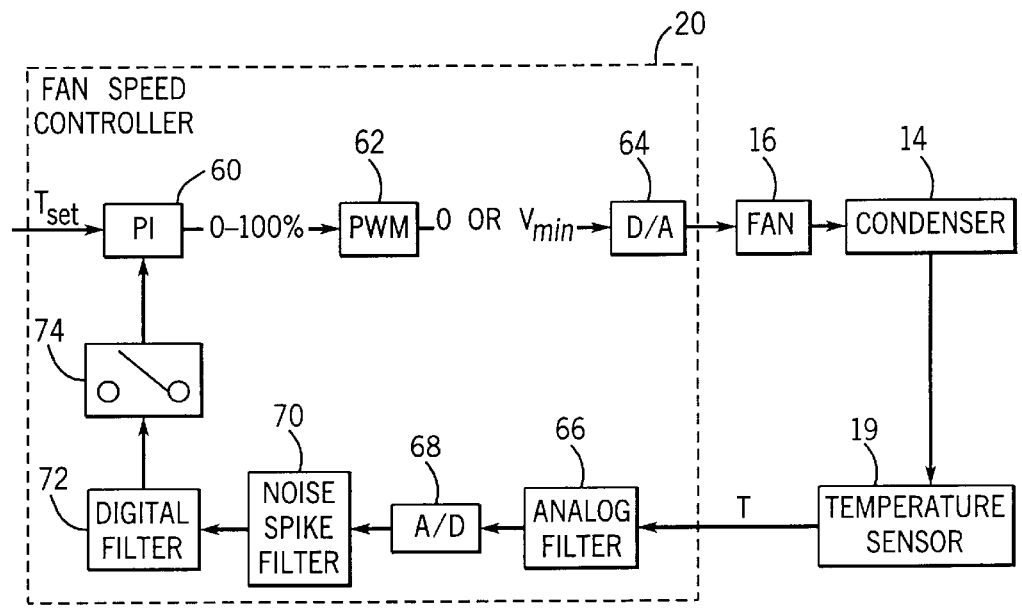
FIG. 7 is a control diagram of the controller's operation in a second control State.

In State 2, the microcomputer 22 executes a proportional integral control algorithm which determines the output control signal from the temperature set point $T_{set}$ and the sampled temperature signal T. The control algorithm is represented in FIG. 7 and the controller gain is determined from the equation:

$$K_2 = \left(\frac{V_{max}}{V_{min}} - 1\right)K_1 \tag{7}$$

where $K_1$ and $K_2$ are the controller gains in States 1 and 2, respectively. Note that the pattern recognition adaptive controller determines the appropriate controller gain in State 1, and the integral time in State 2 is set equal to the integral time in State 1, which provides a bumpless transfer of control when entering State 2. As shown in FIG. 3, the PI output $U_{pwm}$ is set at 100% which is equal to the minimum constant speed of the fan 16.

The PI control algorithm 60 produces an output signal u designating a percentage, between 0 and 100%, of the output parameter. That output signal u is applied to the pulse width modulation (PWM) block 62 which converts the percentage into a pulsed signal having a numerical value of either zero or $V_{min}$, which is the voltage for the minimum fan speed. The pulsed signal has a variable duty cycle that corresponds to the percentage designated by the output signal u from the PI control process 60.

The PWM block 62 determines the time duration $t_{pulse}$ of the pulse according to the expression:

$$t_{pulse} = \frac{u}{100\%} t_{cycle} \tag{8}$$

where u is the output from the PI controller and $t_{cycle}$ is the time between the start of consecutive pulses. For example, $t_{cycle}$ may be equal to thirty seconds.

This digital output then is converted into an analog voltage at D/A converter 64, which is part of the motor driver 29, thereby producing an output voltage that is applied to the motor of the fan 16. The movement of the fan produces a flow of air through the condenser 14 that affects the condenser temperature T which is detected by sensor 19. The sensor signal is applied to an analog filter 66 having an output that then is digitized by analog-to-digital converter 68 at a sampling period h. The digitized output is processed by a noise spike filter 70 and a digital filter 72 similar to the software components for the PAC/PI control in State 1. Then the filtered signal is sampled at block 74 at a period nh to produce samples which are applied to the PI algorithm in control process 60.

Operation of the controller 20 makes a transition from State 2 back to State 1 when the controller output has remained at 100% output for a predefined number (X) of seconds (e.g., X=60) as long as the condenser temperature T remains above the temperature set point $T_{set}$. When this occurs, the PI control in State 2 has been operating the fan in a 100% duty cycle mode, the fastest speed which can be achieved in that state, for a prolonged period and the refrigerant temperature now exceeds the desired set point. This means that an analog variation of the fan speed can be utilized in State 1. A transition may also occur from State 2 directly to the Shut-Down State when the compressor 12 is turned off while operating in State 2.

What is claimed is:

1. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein the first transition condition occurs at least in part based on a comparison of the speed of the fan to a predefined speed level and the second transition condition occurs at least in part based on a comparison of the duty cycle of the fan to a given value.

2. The method as recited in claim 1 wherein the second transition condition occurs when the duty cycle is above the given value for a given period of time.

3. The method as recited in claim 1 wherein operating the fan in the first state of operation employs proportional integral control.

4. The method as recited in claim 3, wherein the proportional integral control is tuned with a pattern recognition adaptive control algorithm.

5. The method as recited in claim 1 wherein operating the fan in the second state of operation employs proportional integral control.

6. The method as recited in claim 1 wherein operating the fan In the second state of operation employs proportional integral control in which a gain parameter and an integral time are determined in response to a pattern recognition adaptive control algorithm.

7. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein the first transition condition occurs when the fan has operated below a predefined speed level for a predetermined period of time.

8. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein the first transition condition occurs when the fan has operated below a predefined speed level for a predetermined period of time and the temperature measurement is below the temperature set point.

9. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein the second transition condition occurs when the duty cycle is above a given value for the given period of time, and wherein the given value is 100%.

10. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein the second transition condition occurs when the duty cycle is above a given value for the given period of time and the temperature measurement is above the temperature set point.

11. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein making a transition from the first state to the second state initially sets the duty cycle of the fan to 100%.

12. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein making a transition from the second state to the first state initially operates the fan at a minimum speed at which the fan can operate.

13. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, wherein in the second state the fan is operated at a minimum speed at which the fan can operate.

14. A method for operating a fan which produces an air flow across a condenser of a refrigeration system, said method comprising:

sensing a temperature of the condenser to produce a temperature measurement;

operating the fan in a first state of operation in which speed of the fan is varied in response to a comparison of the temperature measurement to a temperature set point;

operating the fan in a second state of operation in which the fan is pulsed on and off thereby defining a duty cycle of operation;

making a transition from the first state to the second state upon the occurrence of a first transition condition; and making a transition from the second state to the first state upon the occurrence of a second transition condition, said method further comprising operating the fan in a start-up state upon starting the refrigeration system, the start-up state has a first sub-state, a second sub-state and a third sub-state, wherein, when the temperature measurement is greater than a predefined temperature upon starting, operating in the first sub-state in which the fan is operated at a predefined speed which is determined from previous operation in the first state;

when the temperature measurement is less than the predefined temperature upon starting, operating in the second sub-state in which the fan is operated at a given speed;

making a transition from the first sub-state to the third sub-state after a warm-up period of time;

making a transition from the second sub-state to one of the third sub-state and the first state upon an occurrence of a third transition condition;

operating in the third sub-state in which the fan is operated at the predefined speed; and making a transition from the third sub-state to the first state upon an occurrence of a fourth transition condition.

15. The method as recited in claim 14 wherein further comprising while operating in the first state deriving an average speed of the fan (16), wherein the average speed is the predefined speed employed in the first sub-state.

16. The method as recited in claim 15 wherein deriving an average speed of the fan (16) utilizes an exponentially weighted moving average.

17. The method as recited in claim 14 wherein the given speed is the minimum speed at which the fan (16) can operate.

18. The method as recited in claim 14 wherein making a transition from the second sub-state occurs to the third sub-state when the temperature measurement is greater than the predefined temperature for an interval of time, and occurs to the first state after a start-up interval of time.

19. The method as recited in claim 14 wherein the fourth transition condition is selected from a group consisting of operation being in the start-up state for a start-up interval of time, the temperature measurement is greater than the temperature set point, and a negative rate of change in the temperature measurement.

* * * * *

UNITED STATES PATENT AND TRADEMARK OFFICE
CERTIFICATE OF CORRECTION

PATENT NO. : 6,594,554 B1
DATED : July 15, 2003
INVENTOR(S) : Seem et al.

It is certified that error appears in the above-identified patent and that said Letters Patent is hereby corrected as shown below:

<u>Title page,</u>
Item [*] Notice, delete the phrase "by 392 days" and insert -- by 396 days --

Signed and Sealed this

Eighteenth Day of May, 2004

JON W. DUDAS
*Acting Director of the United States Patent and Trademark Office*